(12) United States Patent
Smith et al.

(10) Patent No.: US 9,079,175 B1
(45) Date of Patent: Jul. 14, 2015

(54) REGENERATION OF AN ACIDIC CATALYST BY ADDITION OF C1 TO C10 PARAFFINS

(71) Applicant: UOP LLC, Des Plaines, IL (US)

(72) Inventors: Stuart Smith, Lake Zurich, IL (US); Alakananda Bhattacharyya, Glen Ellyn, IL (US); Erin M. Broderick, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/229,403

(22) Filed: Mar. 28, 2014

(51) Int. Cl.
*B01J 38/56* (2006.01)
*B01J 31/40* (2006.01)

(52) U.S. Cl.
CPC .......... *B01J 31/4015* (2013.01); *B01J 2531/31* (2013.01)

(58) Field of Classification Search
CPC .................................. B01J 38/56; B01J 38/50
USPC ........................ 502/31, 29, 56, 514, 515, 518
See application file for complete search history.

(56) References Cited

U.S. PATENT DOCUMENTS

| | | | |
|---|---|---|---|
| 2,417,698 | A | 3/1947 | McAllister et al. |
| 3,201,495 | A | 8/1965 | Fountain |
| 6,797,853 | B2 | 9/2004 | Houzvicka et al. |
| 7,488,859 | B2 | 2/2009 | Huang et al. |
| 7,651,970 | B2 | 1/2010 | Elomari et al. |
| 7,674,739 | B2 | 3/2010 | Elomari et al. |
| 7,678,727 | B2 | 3/2010 | Harris et al. |
| 7,691,771 | B2 | 4/2010 | Harris et al. |
| 7,732,363 | B2 | 6/2010 | Elomari et al. |
| 7,737,363 | B2 | 6/2010 | Kambe |
| 7,754,636 | B2 | 7/2010 | Elomari et al. |
| 7,825,055 | B2 | 11/2010 | Elomari et al. |
| 7,956,002 | B2 | 6/2011 | Elomari et al. |
| 7,995,495 | B2 | 8/2011 | Lin |
| 8,070,939 | B2 | 12/2011 | Hommeltoft et al. |
| 8,524,623 | B2 | 9/2013 | Timken et al. |

*Primary Examiner* — Edward Johnson

(57) ABSTRACT

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

20 Claims, 1 Drawing Sheet

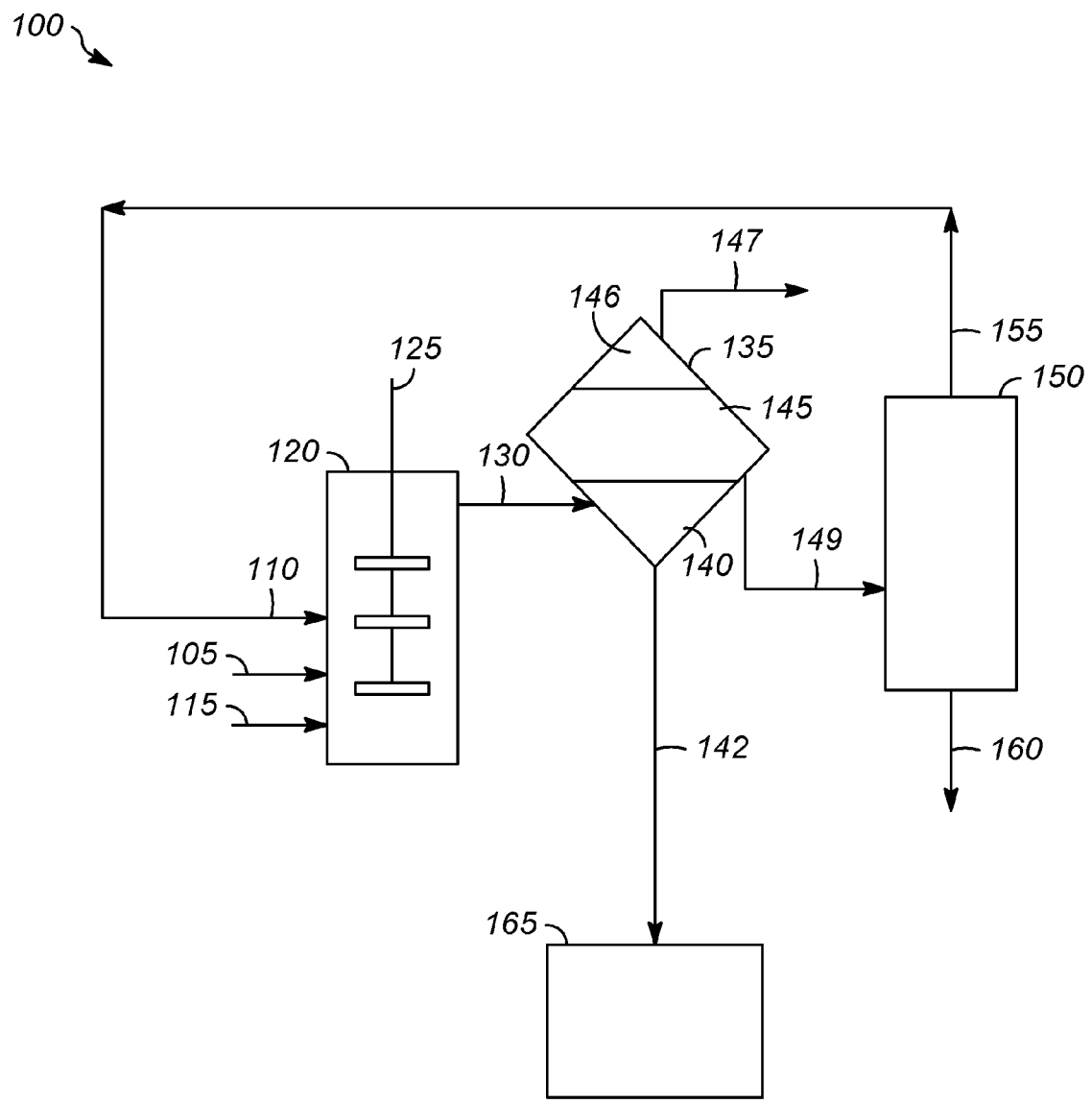

REGENERATION OF AN ACIDIC CATALYST BY ADDITION OF C1 TO C10 PARAFFINS

BACKGROUND OF THE INVENTION

Commercially, the alkylation of isoparaffins is catalyzed by acids such as sulfuric acid and hydrofluoric acid. Conjunct polymer (acid soluble oils, (ASO) also known as red oil) forms as a byproduct of the alkylation reaction, as well as other hydrocarbon reactions. When too much conjunct polymer is present, the acid catalyst loses its effectiveness. The acid must be replaced with stronger acid, or the conjunct polymer must be removed in order to reactivate the catalyst. With sulfuric acid as the catalyst, the ASO is burned, and with hydrofluoric acid, the hydrofluoric acid is distilled away from the ASO. Sulfuric acid and hydrofluoric acid are hazardous and corrosive, and their use in industrial processes requires a variety of environmental controls.

There has been a move to replace the use of sulfuric acid and hydrofluoric acid with more environmentally friendly materials.

One such process utilizes acidic ionic liquids as catalysts in hydrocarbon conversion processes, such as alkylation, isomerization, disproportionation, and oligomerization. Conjunct polymers are byproducts of the hydrocarbon reaction using ionic liquids, and they form a complex with the ionic liquid catalyst. The ionic liquid catalyst loses its effectiveness over time as the amount of conjunct polymer increases. It must then either be replaced or regenerated. Because ionic liquids are typically fairly expensive, processes for regenerating the ionic liquid catalysts are needed.

A variety of methods for regenerating ionic liquids have been developed. The ionic liquid containing the conjunct polymer could be contacted with a reducing metal (e.g., Al), an inert hydrocarbon (e.g., hexane), and hydrogen and heated to about 100° C. The conjunct polymer will be transferred to the hydrocarbon phase, allowing for the conjunct polymer to be removed from the ionic liquid phase. See e.g., U.S. Pat. No. 7,651,970; U.S. Pat. No. 7,825,055; U.S. Pat. No. 7,956,002; and U.S. Pat. No. 7,732,363.

Another method involves contacting the ionic liquid containing the conjunct polymer with a reducing metal (e.g., Al) in the presence of an inert hydrocarbon (e.g. hexane), but in the absence of added hydrogen, and heating to about 100° C. The conjunct polymer will be transferred to the hydrocarbon phase, allowing for the conjunct polymer to be removed from the ionic liquid phase. See e.g., U.S. Pat. No. 7,674,739.

Still another method of regenerating the ionic liquid involves contacting the ionic liquid containing the conjunct polymer with a reducing metal (e.g., Al), HCl, and an inert hydrocarbon (e.g. hexane), and heating to about 100° C. The conjunct polymer will be transferred to the hydrocarbon phase, allowing for the CP to be removed from the IL phase. See e.g., U.S. Pat. No. 7,727,925.

The ionic liquid can be regenerated by adding a homogeneous metal hydrogenation catalyst (e.g., $(PPh_3)_3RhCl$) to the ionic liquid containing the conjunct polymer and an inert hydrocarbon (e.g. hexane). Hydrogen would be introduced, and the conjunct polymer would be reduced and transferred to the hydrocarbon layer. See e.g., U.S. Pat. No. 7,678,727.

Another method for regenerating the ionic liquid involves adding HCl, isobutane, and an inert hydrocarbon to the ionic liquid containing the conjunct polymer and heating to about 100° C. The conjunct polymer would react to form an uncharged complex, which would transfer to the hydrocarbon phase. This reaction increases the carbon count of the conjunct polymer. See e.g., U.S. Pat. No. 7,674,740.

The ionic liquid could also be regenerated by adding a supported metal hydrogenation catalyst (e.g. Pd/C) to the ionic liquid containing the conjunct polymer and an inert hydrocarbon (e.g. hexane). Hydrogen would be introduced and the conjunct polymer would be reduced and transferred to the hydrocarbon layer. See e.g., U.S. Pat. No. 7,691,771.

Still another method involves adding a basic reagent that displaces the conjunct polymer and is a part of the regeneration of the catalyst. The basic reagents are described as nitrogen-containing compounds such as amines, pyridinium compounds, or pyrrolidinium compounds. For example, a suitable substrate (e.g. pyridine) is added to the ionic liquid containing the conjunct polymer. After a period of time, an inert hydrocarbon would be added to wash away the liberated conjunct polymer. The ionic liquid precursor [1-butyl-pyridinium][Cl] would be added to the ionic liquid (e.g. [1-butyl-pyridinium][$Al_2Cl_7$]) containing the conjunct polymer followed by an inert hydrocarbon. After a given time of mixing, the hydrocarbon layer would be separated, resulting in a regenerated ionic liquid. The solid residue would be converted to ionic liquid by adding $AlCl_3$. The conjunct polymer is said to be a neutral species coordinated to free $AlCl_3$. The conjunct polymer is liberated when the chloride from the added ionic liquid precursor coordinates to the $AlCl_3$ to form $AlCl_4^-$. See e.g., U.S. Pat. No. 7,737,363 and U.S. Pat. No. 7,737,067.

Another method involves adding the ionic liquid containing the conjunct polymer to a suitable substrate (e.g. pyridine) and an electrochemical cell containing two aluminum electrodes and an inert hydrocarbon. A voltage would be applied and the current measured to determine the extent of reduction. After a given time, the inert hydrocarbon would be separated, resulting in a regenerated ionic liquid. See, e.g., U.S. Pat. No. 8,524,623.

All of these regeneration approaches have drawbacks. Many of them cannot achieve above 90% conversion of the conjunct polymer, which then builds up in the process. Of those that can provide high levels of conversion, hydrogenation of the spent ionic liquid with supported (e.g., U.S. Pat. No. 7,691,771) and unsupported (e.g., U.S. Pat. No. 7,678,727) hydroprocessing catalysts may result in the active catalytic metals being extracted into the ionic liquid phase. Many catalyst supports also react irreversibly with the chloroaluminate anion of the ionic liquid. Although the use of metallic aluminum for regeneration (e.g., U.S. Pat. No. 7,995,495) is effective, it introduces undesirable solids handling issues into the refinery. Finely divided aluminum is pyrophoric and presents safety issues in a refining environment. This approach also results in the creation of additional $AlCl_3$, which has to be removed from the ionic liquid phase (e.g., U.S. Pat. No. 7,754,636) to avoid building up to a molar ratio relative to the ionic liquid cation at which solids will start coming out of solution and cause plugging issues. Electrochemical approaches (e.g., U.S. Pat. No. 8,524,623) are not economically viable at commercial scales.

Therefore, there remains a need for additional methods of regenerating acidic catalysts in reactions.

SUMMARY OF THE INVENTION

One aspect of the invention involves a method for regenerating deactivated acidic catalyst containing conjunct polymer. In one embodiment, the method includes contacting the deactivated acidic catalyst containing the conjunct polymer with at least one $C_1$ to $C_{10}$ paraffin in a regeneration zone under regeneration conditions, the acidic catalyst selected from the group consisting of sulfuric acid, hydrofluoric acid, trifluoromethanesulfonic acid, phosphoric acid, boron trifluoride, and acidic ionic liquids, the conjunct polymer reacting with the at least one $C_1$ to $C_{10}$ paraffin, resulting in a mixture comprising regenerated acidic catalyst, the reacted $C_1$ to $C_{10}$ paraffin, and the released conjunct polymer; and separating the released conjunct polymer from the regenerated acidic catalyst.

BRIEF DESCRIPTION OF THE DRAWING

The FIGURE illustrates one embodiment of a method for regenerating deactivated acidic catalysts containing conjunct polymer according to the present invention.

DETAILED DESCRIPTION OF THE INVENTION

It has been discovered that deactivated acidic catalysts containing conjunct polymer can be regenerated using a reagent that contains no added metals and that reacts at mild conditions. The reagent is a $C_1$ to $C_{10}$ paraffin. The $C_1$ to $C_{10}$ paraffin reacts with the conjunct polymer, and the resulting charge neutral conjunct polymer can be washed away with a suitable solvent, such as hexane. One advantage of using $C_1$ to $C_{10}$ paraffins is that the reacted $C_1$ to $C_{10}$ paraffin does not have to be removed from the conjunct polymer.

In addition, the mild conditions under which the process can be performed may result in lower operating costs than processes requiring harsher conditions. The mild operating conditions may also result in lower capital costs due to the ability to use less expensive materials of construction.

By deactivated acidic catalysts containing conjunct polymer, we mean acidic catalysts that have been used in hydrocarbon conversion processes, and in which conjunct polymers have formed. The conjunct polymer is bound to the ionic liquid, and it cannot be separated from the ionic liquid without some type of reaction. Washing with a solvent will not remove the conjunct polymer from the ionic liquid. Deactivated acidic catalysts include partially or completely deactivated acidic catalysts. Acidic catalysts which form conjunct polymers in hydrocarbon conversion processes include sulfuric acid, hydrofluoric acid, trifluoromethanesulfonic acid (triflic acid), phosphoric acid, boron trifluoride, and acidic ionic liquids. By conjunct polymer, we mean the olefinic, conjugated cyclic hydrocarbons that form as a byproduct of various hydrocarbon conversion processes, including but not limited to alkylation, oligomerization, isomerization, and disproportionation.

By acidic ionic liquid, we mean an ionic liquid capable of catalyzing reactions typically carried out with an acid. As known in the art, acids such as sulfuric acid and hydrofloric acid are often used to catalyze these reactions. These reactions include, e.g. alkylation, oligomerization, isomerization, and disproportionation. Oftentimes the acids employed in these reactions have Hammett acidity functions ($H_0$) less than 7, or less than 5, or less than 3, or less than 0, or less than −3, or less than −5, or less than −7, or less than −9. If the ionic liquid does not possess an acidic proton in its structure (e.g. 1-butyl-3-methylimidazolium heptachloroaluminate), addition of an exogenous acid is acceptable, provided the Hammett acidity function ($H_0$) of the added acid is less than 7 within the ionic liquid, or less than 5, or less than 3, or less than 0, or less than −3, or less than −5, or less than −7, or less than −9.

The contact of a $C_1$ to $C_{10}$ paraffin with an acidic catalyst that contains conjunct polymer releases the conjunct polymer from the acidic catalyst. The regenerated acidic catalyst can be separated from the reacted $C_1$ to $C_{10}$ paraffin and the conjunct polymer. The regenerated acidic catalyst can then be re-activated with acid, if needed. The acidic catalysts can be recycled to a hydrocarbon conversion process.

In some embodiments, the deactivated acidic ionic liquid catalyst containing the conjunct polymer is contacted with the $C_1$ to $C_{10}$ paraffin in the presence of a solvent which is immiscible with the ionic liquid. In this situation, two phases will result: one containing the regenerated ionic liquid, and the other containing the reacted $C_1$ to $C_{10}$ paraffin and the released conjunct polymer. The conjunct polymer can then be removed from the solvent, and the solvent can be recycled.

In other embodiments, the solvent immiscible with the ionic liquid is added after the contacting step in order to separate the conjunct polymer from the regenerated ionic liquid.

The deactivated acidic catalyst and the $C_1$ to $C_{10}$ paraffin are contacted for a period of time sufficient to allow the conjunct polymer to react with the $C_1$ to $C_{10}$ paraffin. This will typically take in the range of about 10 min to about 48 hr, or about 10 min to about 24 hr, or about 10 min to about 15 hr, or about 10 min to about 10 hr, or about 1 hr to about 10 hr, or about 3 hr to about 7 hr, or about 4 hr to about 5 hr.

The contacting typically takes place at a temperature in the range of from about −20° C. to the decomposition temperature of the acidic catalysts. A typical temperature range is about −20° C. to about 200° C., or about 20° C. to about 150° C., or about 20° C. to about 125° C., or about 20° C. to about 100° C., or about 20° C. to about 75° C., or about 20° C. to about 50° C., or about 50° C. to about 175° C., or about 75° C. to about 175° C., or about 100° C. to about 175° C., or about 125° C. to about 175° C. In some embodiments, the mixture is heated.

The pressure is typically in a range of about 101 kPaa to about 10.1 MPaa, or about 689 kPaa to about 5.5 MPaa. The pressure is typically determined by the vapor pressure of the solvent used (typically the vapor pressure of the solvent at the reaction temperature).

The molar ratio of the $C_1$ to $C_{10}$ paraffin to the ionic liquid is typically at least 1:1.

In some embodiments, the contacting can take place in the presence of an acid or an acid precursor. Suitable acids and acid precursors include, but are not limited to, HCl, tert-butyl chloride, or 2-chlorobutane. The acid precursor can be any molecule that will break down to form the acid.

The contacting can take place in any suitable process, such as solvent extraction, or contacting in one or more mixer/settlers.

The reaction will proceed simply by contacting the $C_1$ to $C_{10}$ paraffin with the acidic catalyst. However, the contact between the $C_1$ to $C_{10}$ paraffin and the acidic catalyst can be increased by mixing.

The contacting step may be practiced in laboratory scale experiments through full scale commercial operations. The process may be operated in batch, continuous, or semi-continuous mode. The contacting step can take place in various ways, with both concurrent and co-current flow processes being suitable. The order of addition of the reactants is not critical. For example, the reactants can be added individually, or some reactants may be combined or mixed before being combined or mixed with other reactants.

After contacting the acidic catalyst, the $C_1$ to $C_{10}$ paraffin, and the immiscible solvent, two phases result, a catalyst phase containing the acidic catalyst and an organic phase containing the conjunct polymer and the immiscible solvent, if present. In some embodiments, the phases will separate due to the density difference between the two phases. In other embodiments, other separation processes may be needed. In some embodiments, the conjunct polymer can be decanted away.

Decanting can be suitable if there is enough conjunct polymer present and it separates from the acidic catalysts.

If the immiscible solvent is not included in the contacting step, it is added to separate the regenerated ionic liquid from the conjunct polymer.

When the acidic catalyst is an ionic liquid, after separation of the conjunct polymer from the ionic liquid, the ionic liquid can be recycled to a hydrocarbon conversion process. Depending on the conditions required for the hydrocarbon conversion process, an acid additive can be added. Other acidic catalyst may also need to be regenerated by adding an appropriate acid.

In one embodiment, the regeneration process is a solvent extraction process. For ease of discussion, the use of deactivated acidic ionic liquid catalyst in the solvent extraction process will be described. However, as will be understood by those of skill in the art, other acidic catalysts which form conjunct polymers could also be used.

In the solvent extraction method, a solvent and the $C_1$ to $C_{10}$ paraffin are added to the deactivated acidic catalyst containing the conjunct polymer. The solvent and the $C_1$ to $C_{10}$ paraffin can be pre-mixed and added together, or they can be added separately, either at the same time or sequentially.

In a system without stirring or after stirring is ended, the components can separate into two phases based on the density difference between the ionic liquid phase and the organic phase which contains the conjunct polymer. The ionic liquid will settle to the bottom, and the conjunct polymer and the reacted $C_1$ to $C_{10}$ paraffin will be on top of the ionic liquid layer. Increasing the top layer with additional solvent will increase the conjunct polymer recovery.

The deactivated ionic liquid catalyst, the solvent, and the $C_1$ to $C_{10}$ paraffin are contacted long enough for the conjunct polymer to react with the $C_1$ to $C_{10}$ paraffin, typically about 10 min to about 48 hr. The deactivated ionic liquid catalyst, the solvent, and the $C_1$ to $C_{10}$ paraffin are typically mixed while being contacted.

The deactivated ionic liquid, the solvent, and the $C_1$ to $C_{10}$ paraffin are typically contacted at a temperature in the range of from about −20° C. to less than the decomposition temperature of the ionic liquid, or about −20° C. to about 200° C.

The mixture is then allowed to separate into two phases: an ionic liquid phase and a hydrocarbon phase. In some embodiments, separation occurs due to the density difference between the ionic liquid phase and the hydrocarbon phase. Separation typically takes on the order of a few minutes to hours; it is generally less than about 1 hr.

The hydrocarbon layer is decanted from the ionic liquid. The ionic liquid can be further washed with solvent (either the same solvent used in the extraction or a different one), if desired. As the reaction occurs, the conjunct polymer is extracted into the solvent layer.

In some embodiments, after separation of the ionic liquid and the hydrocarbon layer, the ionic liquid can be sent to a hydrocarbon conversion process. Depending on the conditions required for the hydrocarbon conversion process, an acid additive can be added. Suitable acids and acid precursors include, but are not limited to, HCl, tert-butyl chloride, or 2-chlorobutane. The acid precursor can be any molecule that will break down to form the acid.

The ionic liquid can be any acidic ionic liquid. There can be one or more ionic liquids. The ionic liquid comprises an organic cation and an anion. Suitable cations include, but are not limited to, nitrogen-containing cations and phosphorus-containing cations. Suitable organic cations include, but are not limited to:

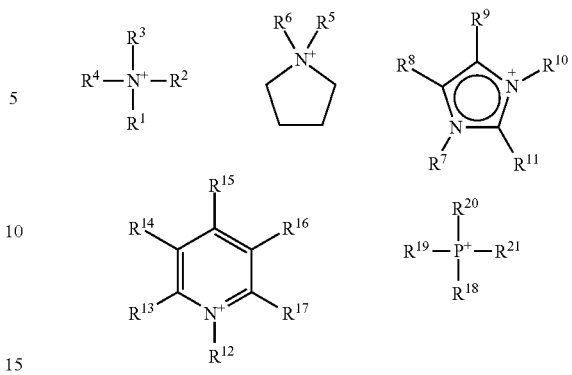

where $R^1$-$R^{21}$ are independently selected from $C_1$-$C_{20}$ hydrocarbons, $C_1$-$C_{20}$ hydrocarbon derivatives, halogens, and H. Suitable hydrocarbons and hydrocarbon derivatives include saturated and unsaturated hydrocarbons, halogen substituted and partially substituted hydrocarbons and mixtures thereof. $C_1$-$C_8$ hydrocarbons are particularly suitable.

The anion can be derived from halides, typically halometallates, and combinations thereof. The anion is typically derived from metal and nonmetal halides, such as metal and nonmetal chlorides, bromides, iodides, fluorides, or combinations thereof. Combinations of halides include, but are not limited to, mixtures of two or more metal or nonmetal halides (e.g., $AlCl_4^-$ and $BF_4^-$), and mixtures of two or more halides with a single metal or nonmetal (e.g., $AlCl_3Br^-$). In some embodiments, the metal is aluminum, with the mole fraction of aluminum ranging from 0<Al<0.25 in the anion. Suitable anions include, but are not limited to, $AlCl_4^-$, $Al_2Cl_7^-$, $Al_3Cl_{10}^-$, $AlCl_3Br^-$, $Al_2Cl_6Br^-$, $Al_3Cl_9Br^-$, $AlBr_4^-$, $Al_2Br_7^-$, $Al_3Br_{10}^-$, $GaCl_4^-$, $Ga_2Cl_7^-$, $Ga_3Cl_{10}^-$, $GaCl_3Br^-$, $Ga_2Cl_6Br^-$, $Ga_3Cl_9Br^-$, $CuCl_2^-$, $Cu_2Cl_3^-$, $Cu_3Cl_4^-$, $ZnCl_3^-$, $FeCl_3^-$, $FeCl_4^-$, $Fe_3Cl_7^-$, $PF_6^-$, and $BF_4^-$.

The $C_1$ to $C_{10}$ paraffin can be a normal paraffin, an isoparaffin, or a cyclic paraffin having from 1 to 10 carbon atoms. One or more $C_1$ to $C_{10}$ paraffins can be used. If more than one $C_1$ to $C_{10}$ paraffin is used, the $C_1$ to $C_{10}$ paraffins can be of the same type, e.g., all normal, or they can be of different types, e.g., normal and cyclic, etc. Examples of suitable normal $C_1$ to $C_{10}$ paraffins and isoparaffins include, but are not limited to, butanes, pentanes, hexanes, heptanes, octanes, and nonanes. Examples of suitable cyclic $C_1$ to $C_{10}$ paraffins include, but are not limited to, methylcyclohexane, methylcyclopentane, cyclohexane, dimethylcyclopentanes, dimethylcyclohexanes, trimethylcyclopentanes, trimethylcyclohexanes, or combinations thereof.

The immiscible solvent will depend on the acidic catalysts being regenerated. The solvent can be any solvent which is capable of forming a separate phase from the catalyst phase. There can be one or more solvents. Suitable solvents for halometallate ionic liquids include, but are not limited to, n-paraffins, isoparaffins, and cyclic paraffins, such as $C_4$ to $C_{10}$ paraffins, and aromatic solvents. Examples of suitable solvent include, but are not limited to, propane, n-butane, isobutane, n-pentane, isopentane, n-hexane, isohexane, methylcyclohexane, cyclohexane, methylcyclopentane, n-paraffins, isoparaffins, naphthenes and aromatics or combinations thereof.

The FIGURE illustrates one embodiment of the process 100. The $C_1$ to $C_{10}$ paraffin 105, the solvent 110, and the ionic liquid containing the conjunct polymer 115 are introduced into regeneration zone 120 where they are contacted. The mixture can be stirred using a mixer 125, if desired.

The deactivated ionic liquid catalyst containing the conjunct polymer 115 reacts with the $C_1$ to $C_{10}$ paraffin 105 and is easily transferred to the organic phase.

The mixture 130 is sent to a settler 135, where phase separation occurs. The heavier catalyst phase 140 containing the ionic liquid settles to the bottom below the lighter organic phase 145 containing the conjunct polymer, the $C_1$ to $C_{10}$ paraffin, and the solvent. There may be a gas and/or vapor phase 146 which can be removed in stream 147 and further processed, if desired. The gas and/or vapor phase 146 can contain one or more of solvent, nitrogen, and HCl if a source of HCl was used (or other acids if a source of the other acid was used).

A stream 149 of the organic phase 145 is sent to a separation zone 150 where the solvent 155 is separated from the conjunct polymer and reacted $C_1$ to $C_{10}$ paraffin 160. The solvent 155 can be recycled to the regeneration zone 120.

A stream 142 of the catalyst phase 140 can be recycled to a hydrocarbon conversion process 165, such as alkylation, isomerization, disproportionation, and oligomerization.

EXAMPLES

Example 1

Synthesis of $[(^nBu)_3P(Hex)][Al_2Cl_7]$

Tributylhexyl phosphonium chloroaluminate ($[(^nBu)_3P(Hex)][Al_2Cl_7]$) is a room temperature ionic liquid prepared by mixing anhydrous tributylhexyl phosphonium chloride with slow addition of 2 moles of anhydrous aluminum chloride in an inert atmosphere. After several hours of mixing, a pale yellow liquid was obtained. The resulting acidic IL was used as the catalyst for the alkylation of isobutane with 2-butenes.

Example 2

Generation of Spent $[(^nBu)_3P(Hex)][Al_2Cl_7]$

The spent ionic liquid samples were generated in a continuous alkylation process in which 2-butenes were contacted with tributylhexylphosphonium heptachloroaluminate ionic liquid in the presence of isobutane and 2-chlorobutane. Contacting took place in a 300 mL autoclave stirred at 1900 rpm at ambient temperature. The mixture was continuously transferred to a gravity separator, and the ionic liquid was recycled to the alkylation reactor. Flow rates and feed ratios varied over the course of the reaction which took place over several days to weeks for the various samples. At the end of each run, the heavy fraction containing ionic liquid was collected and stored under nitrogen.

Example 3

Characterization of Recovered Conjunct Polymer

The amount of conjunct polymer in the deactivated ionic liquid generated in Example 2 was determined by massing 10.13 g of the material into a vial and washing the ionic liquid with about 3×5 mL n-pentane (pre-dried using activated 3 A molecular sieves) in the nitrogen glovebag. The ionic liquid was then dried under vacuum using a rotary evaporator, yielding 10.01 g of the ionic liquid. This washed and dried ionic liquid was then hydrolyzed by slowly adding the ionic liquid to crushed ice contained in a jar and extracting the aqueous layer with 35 mL of n-pentane. The n-pentane was separated from the aqueous layer and the aqueous layer was washed two more times with n-pentane. The total volume of water/ice and n-pentane used was 75 mL and 80 mL, respectively. The combined n-pentane layers were then washed twice with 15 mL of 0.1% $Na_2CO_3$ solution and once with 20 mL of 0.1% $H_2SO_4$ solution. The separated n-pentane layer was then dried over anhydrous $MgSO_4$, filtered through fiberglass and concentrated under vacuum to yield 0.324 g of yellow conjunct polymer, indicating that the concentration of conjunct polymer within the ionic liquid was 3.2 wt. %. The conjunct polymer was analyzed by simulated distillation (ASTM D2887) and is shown in Table 1 below.

Example 4

Removal of Conjunct Polymer by Reaction with Methylcyclohexane

The deactivated ionic liquid (11.50 g) generated in Example 2 was added to an oven-dried 75 mL Hastelloy C autoclave, equipped with a stir bar, in a nitrogen glovebag. To this autoclave was added methylcyclohexane (14.08 g, pre-dried with activated 3 A molecular sieves) and the autoclave was sealed in the glovebag, removed and heated to 125° C. with stirring at 1000 rpm. After 0.5 h, the reaction temperature was 125° C. and the reaction was maintained at this temperature for 5 h. After 5 h of reaction at 125° C., the reaction was cooled to ambient temperature with a water bath without stirring. The autoclave was then vented, and the methylcyclohexane layer was separated from the ionic liquid layer. The amount of conjunct polymer remaining within the ionic liquid layer was determined by massing 6.05 g of the material into a vial and washing the ionic liquid with 3×5 mL n-pentane (pre-dried using activated 3 A molecular sieves) in the nitrogen glovebag. The ionic liquid was then dried under vacuum using a rotary evaporator, yielding 5.41 g of the ionic liquid. This washed and dried ionic liquid was then hydrolyzed as described in Example 3 to yield 0.062 g of conjunct polymer, indicating that the concentration of conjunct polymer within the ionic liquid was 1.2 wt. % and was reduced by 62%. The conjunct polymer remaining within the ionic liquid and in the methylcyclohexane layer was analyzed by simulated distillation (ASTM D2887) and is shown in Table 1 below.

Example 5

Removal of Conjunct Polymer by Reaction with n-Pentane

The deactivated ionic liquid (11.02 g) generated in Example 2 was added to an oven-dried 75 mL Hastelloy C autoclave, equipped with a stir bar, in a nitrogen glovebag. To this autoclave was added n-pentane (11.79 g, pre-dried with activated 3 A molecular sieves) and the autoclave was sealed in the glovebag, removed and heated to 125° C. with stirring at 1000 rpm. After 0.3 h, the reaction temperature was 125° C. and the reaction was maintained at this temperature for 5.5 h. After 5.5 h of reaction at 125° C., the reaction was cooled to ambient temperature with a water bath without stirring. The autoclave was then vented, and the n-pentane layer was separated from the ionic liquid layer. The amount of conjunct polymer remaining within the ionic liquid layer was determined by massing 6.13 g of the material into a vial and washing the ionic liquid with 3×5 mL n-pentane (pre-dried using activated 3 A molecular sieves) in the nitrogen glovebag. The ionic liquid was then dried under vacuum using a rotary evaporator, yielding 5.72 g of the ionic liquid. This washed and dried ionic liquid was then hydrolyzed as described in Example 3 to yield 0.151 g of conjunct polymer, indicating that the concentration of conjunct polymer within the ionic liquid was 2.6 wt. % and was reduced by 19%. The conjunct polymer remaining within the ionic liquid was analyzed by simulated distillation (ASTM D2887) and is shown in Table 1 below.

TABLE 1

Simulated distillation (ASTM D2887) of conjunct polymer samples

| Wt. % | $CP^{a,b}$ | $CP^{a,c}$ | $CP^{a,d}$ | $CP^{a,e}$ |
|---|---|---|---|---|
| $TBP^f$@0.5 | 163 | 115.6 | 161 | 89 |
| TBP@5 | 203.2 | 132 | 250.8 | 101.2 |
| TBP@10 | 219.8 | 157.6 | 266.2 | 102.2 |
| TBP@15 | 232 | 191 | 278 | 197 |
| TBP@20 | 241.2 | 225.2 | 288.6 | 227.2 |
| TBP@25 | 249.2 | 227.8 | 296.8 | 241.4 |
| TBP@30 | 258.2 | 229.6 | 299.6 | 252.8 |
| TBP@35 | 266.2 | 231.6 | 302.8 | 264.4 |
| TBP@40 | 275.2 | 233 | 311.4 | 275.8 |
| TBP@45 | 284.2 | 234.8 | 320.8 | 286.6 |
| TBP@50 | 292.4 | 236.6 | 329.4 | 294.4 |
| TBP@55 | 299.2 | 238.6 | 337.6 | 299.2 |
| TBP@60 | 303.8 | 239.8 | 348 | 303.4 |
| TBP@65 | 312.6 | 241.2 | 359 | 313.6 |
| TBP@70 | 323 | 242.2 | 371.8 | 326.4 |
| TBP@75 | 334.4 | 243.2 | 386.8 | 339.4 |
| TBP@80 | 347.8 | 245 | 405 | 355.4 |
| TBP@85 | 364.8 | 247 | 429 | 375.8 |
| TBP@90 | 388.2 | 248.8 | 463.8 | 402.8 |
| TBP@95 | 425.8 | 256.4 | 521.4 | 448.4 |
| TBP@99.5 | 531.4 | 405 | 607.8 | 579 |

$^a$CP = conjunct polymer,
$^b$CP isolated from ionic liquid generated in Example 2,
$^c$CP isolated from the methylcyclohexane layer, compounds boiling less than 110° C. were removed,
$^d$CP isolated from the ionic liquid layer in Example 4,
$^e$CP isolated from the ionic liquid layer from Example 5 and
$^f$TBP = temperature boiling point at x wt. %

What is claimed is:

1. A method for regenerating deactivated acidic catalyst containing conjunct polymer comprising:
contacting the deactivated acidic catalyst containing the conjunct polymer with at least one $C_1$ to $C_{10}$ paraffin in a regeneration zone under regeneration conditions, the acidic catalyst selected from the group consisting of sulfuric acid, hydrofluoric acid, trifluoromethanesulfonic acid, phosphoric acid, boron trifluoride, and acidic ionic liquids, the conjunct polymer reacting with the at least one $C_1$ to $C_{10}$ paraffin, resulting in a mixture comprising regenerated acidic catalyst, the reacted $C_1$ to $C_{10}$ paraffin, and the released conjunct polymer; and
separating the released conjunct polymer from the regenerated acidic catalyst.

2. The method of claim 1 wherein the acidic catalyst is the acidic ionic liquid.

3. The method of claim 1 further comprising recycling the regenerated acidic catalyst to a hydrocarbon conversion process.

4. The method of claim 1 wherein contacting the deactivated acidic catalyst containing the conjunct polymer with the at least one $C_1$ to $C_{10}$ paraffin takes place in the presence of a solvent immiscible in the ionic liquid.

5. The method of claim 4 further comprising separating the solvent from the organic phase.

6. The method of claim 5 further comprising recycling the separated solvent to the regeneration zone.

7. The method of claim 4 wherein the solvent comprises a paraffin having up to 10 carbon atoms, an aromatic, or combinations thereof.

8. The method of claim 1 wherein the at least one $C_1$ to $C_{10}$ paraffin comprises methylcyclohexane, methylcyclopentane, cyclohexane, dimethylcyclopentanes, dimethylcyclohexanes, trimethylcyclopentanes, trimethylcyclohexanes, or combinations thereof.

9. The method of claim 1 wherein the regeneration conditions include at least one of a temperature in a range of from about −20° C. to about 200° C., a contact time of between about 10 minutes and about 48 hours, and a pressure in a range of about 101 kPa (1 atm) to about 10.1 MPa (100 atm).

10. The process of claim 1 wherein the acidic catalyst is the acidic ionic liquid and wherein the ionic liquid comprises an organic cation and an anion, and wherein the organic cation is selected from the group consisting of:

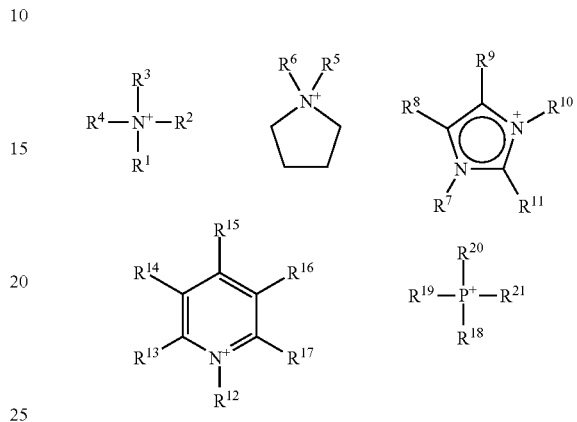

where $R^1$-$R^{21}$ are independently selected from $C_1$-$C_{20}$ hydrocarbons, $C_1$-$C_{20}$ hydrocarbon derivatives, halogens, and H.

11. The process of claim 1 wherein the acidic catalyst is the acidic ionic liquid and wherein the ionic liquid comprises an organic cation and an anion, and wherein the anion is derived from halides, sulfates, bisulfates, nitrates, sulfonates, fluoroalkanesulfonates, or combinations thereof.

12. The process of claim 1 wherein contacting the deactivated acidic catalyst containing the conjunct polymer with the at least one $C_1$ to $C_{10}$ paraffin takes place in the presence of an acid or an acid precursor.

13. A method for regenerating deactivated acidic ionic liquid catalyst containing conjunct polymer comprising:
contacting the deactivated acidic ionic liquid catalyst containing the conjunct polymer with at least one cyclic $C_1$ to $C_{10}$ paraffin in a regeneration zone under regeneration conditions, the conjunct polymer reacting with the at least one cyclic $C_1$ to $C_{10}$ paraffin, resulting in a catalyst phase containing regenerated acidic ionic liquid catalyst and an organic phase containing the reacted cyclic $C_1$ to $C_{10}$ paraffin and the conjunct polymer; and
separating the catalyst phase from the organic phase.

14. The method of claim 13 further comprising recycling the regenerated acidic ionic liquid catalyst to a hydrocarbon conversion process.

15. The method of claim 13 wherein contacting the deactivated acidic ionic liquid catalyst containing the conjunct polymer with the at least one cyclic $C_1$ to $C_{10}$ paraffin takes place in the presence of a solvent immiscible in the ionic liquid.

16. The method of claim 15 further comprising separating the solvent from the organic phase and recycling the separated solvent to the regeneration zone.

17. The method of claim 13 wherein the at least one cyclic $C_1$ to $C_{10}$ paraffin comprises methylcyclohexane, methylcyclopentane, cyclohexane, dimethylcyclopentanes, dimethylcyclohexanes, trimethylcyclopentanes, trimethylcyclohexanes, or combinations thereof.

18. The method of claim 13 wherein the regeneration conditions include at least one of a temperature in a range of from about 25° C. to about 200° C., a contact time of between about 10 minutes and about 48 hours, and a pressure in a range of about 101 kPa (1 atm) to about 10.1 MPa (100 atm).

19. The process of claim 13 wherein the catalyst is a liquid catalyst comprising an ionic liquid and wherein the ionic liquid comprises an organic cation and an anion, and wherein the organic cation is selected from the group consisting of:

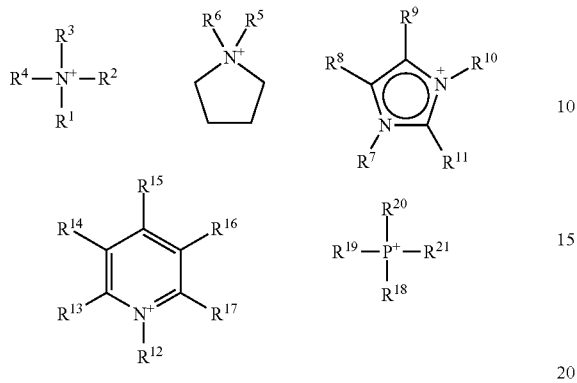

where $R^1$-$R^{21}$ are independently selected from $C_1$-$C_{20}$ hydrocarbons, $C_1$-$C_{20}$ hydrocarbon derivatives, halogens, and H.

20. The process of claim 13 wherein the acidic ionic liquid catalyst comprises an organic cation and an anion, and wherein the anion is derived from halides, sulfates, bisulfates, nitrates, sulfonates, fluoroalkanesulfonates, or combinations thereof.

* * * * *